United States Patent
Bart et al.

(10) Patent No.: US 7,793,597 B2
(45) Date of Patent: Sep. 14, 2010

(54) PORTABLE DESK AND COMPUTER SUPPORT

(75) Inventors: Kevin J Bart, Grand Rapids, MI (US); David T Lippert, Grand Rapids, MI (US)

(73) Assignee: Autoexec, Inc., Grand Rapids, MI (US)

( * ) Notice: Subject to any disclaimer, the term of this patent is extended or adjusted under 35 U.S.C. 154(b) by 559 days.

(21) Appl. No.: 11/705,206

(22) Filed: Feb. 12, 2007

(65) Prior Publication Data

US 2008/0190330 A1 Aug. 14, 2008

(51) Int. Cl.
*A47B 37/00* (2006.01)
(52) U.S. Cl. .................. 108/44; 224/275; 296/24.34
(58) Field of Classification Search ............ 108/42, 108/44, 94, 102, 103, 137, 139, 140; 296/24.34, 296/24.39, 37.8, 37.15; 224/275; 297/135, 297/188.2; 312/235.2, 235.8, 235.9
See application file for complete search history.

(56) References Cited

U.S. PATENT DOCUMENTS

| | | | | |
|---|---|---|---|---|
| 3,922,973 | A * | 12/1975 | Sturgeon | ...................... 108/26 |
| 4,909,159 | A | 3/1990 | Gonsoulin | |
| 4,946,120 | A * | 8/1990 | Hatcher | .................... 248/183.2 |
| 5,092,507 | A * | 3/1992 | Szablak et al. | .............. 224/275 |
| D332,527 | S | 1/1993 | Szablak et al. | |
| 5,542,589 | A * | 8/1996 | McKee | ....................... 224/275 |
| 5,551,616 | A | 9/1996 | Stitt et al. | |
| 5,560,676 | A * | 10/1996 | Griffith et al. | ............ 297/188.2 |
| 5,667,272 | A | 9/1997 | Sutton | |
| 5,973,917 | A * | 10/1999 | White | ...................... 312/223.2 |
| 6,015,198 | A * | 1/2000 | Stair | ....................... 312/235.1 |
| 6,273,310 | B1 | 8/2001 | Gregory | |
| 6,382,745 | B1 * | 5/2002 | Adkins | .................... 312/223.3 |
| 6,426,869 | B1 * | 7/2002 | White | ................... 361/679.01 |
| 6,588,821 | B2 | 7/2003 | Worrell et al. | |
| 2006/0022478 | A1 * | 2/2006 | DeLong et al. | ............. 296/37.8 |
| 2006/0091169 | A1 | 5/2006 | Lippert et al. | |
| 2006/0226670 | A1 * | 10/2006 | Bernstein et al. | ......... 296/24.39 |
| 2006/0286944 | A1 * | 12/2006 | Songwe, Jr. | .................. 455/99 |
| 2008/0053340 | A1 * | 3/2008 | Comeaux et al. | .............. 108/44 |
| 2009/0058152 | A1 * | 3/2009 | Orlo et al. | .................... 297/163 |

OTHER PUBLICATIONS

U.S. Appl. No. 11/542,899, filed Oct. 4, 2006, Bart et al.
"AutoExec and AutoExec Pro Instruction Booklet," published more than one year prior to Feb. 12, 2007. (Exhibit A).

(Continued)

*Primary Examiner*—Janet M Wilkens
(74) *Attorney, Agent, or Firm*—Van Dyke, Gardner, Linn & Burkhart, LLP

(57) ABSTRACT

A portable desk adapted for use in temporary work areas such as a seat in a vehicle includes a main body having a work surface member at a position spaced from a support surface, a first support member adapted to receive a laptop or portable computer mounted on the work surface member for access by the vehicle driver when the portable desk is mounted in the front passenger seat of the vehicle, and a second support member adapted to receive a computer peripheral device, such as a printer, also for access to by the vehicle driver. Preferably, the work surface member is at the top surface of the portable desk, and the first support member may be adjustably positioned between a first position adjacent a driver of the vehicle and a second position spaced away from the vehicle driver.

31 Claims, 6 Drawing Sheets

OTHER PUBLICATIONS

"AutoExec Pro" advertisement, published more than one year prior to Feb. 12, 2007. (Exhibit B).

"AutoExec Travel/Carrying Case" advertisement, published more than one year prior to Feb. 12, 2007. (Exhibit C).

"Auto Exec Express Desk," sold more than one year prior to Feb. 12, 2007 (see U.S. Pat. Pub. 20060091169A1). (Exhibit D).

Nine (9) photos of "Auto-Exec Compu-Stand Desk" sold more than one year prior to Feb. 12, 2007. (Exhibit E).

* cited by examiner

PORTABLE DESK AND COMPUTER SUPPORT

BACKGROUND AND TECHNICAL FIELD OF THE INVENTION

The present invention is directed to portable work surfaces, and in particular to a portable desk or office device for use in vehicles or other temporary or movable work areas as both a storage medium and a portable laptop computer support and/ or a support for a computer peripheral devices such as a printer, speakers, modem, or the like, as well as a writing surface.

People regularly conduct business away from fixed locations such as offices or homes. In such cases, individuals such as salespersons, contractors, and truckers frequently travel using motor vehicles to reach their contacts, work sites or destinations.

Along with reaching remote locations, traveling by motor vehicle enables these individuals to transport many of the items they may need to conduct their business, such as cellular phones, PDA's, documents, files, laptop/portable computers, pens, paperclips, and the like. By having such items in their vehicle, business people are better equipped to efficiently and effectively conduct a broad scope of business without having to make multiple trips between the location of their business contacts and fixed office environments.

However, the glove boxes, center consoles, and door pockets of most motor vehicles are ill equipped to contain the wide array of business and office equipment needed by individuals conducting business "on the road." As such, the motor vehicles of these individuals can become cluttered, making it hard to find needed items or even resulting in lost items, thereby reducing the efficiency of business people conducting mobile business. Such equipment is also likely to move about the vehicle passenger compartment when the vehicle is driven, making it even more difficult to find specific items. Moreover, searching for items while driving is an unsafe practice that may lead to accidents. Furthermore, in the event of an accident, loose items in the passenger compartment of a vehicle can become dangerous projectiles that may injure the occupants.

Another difficulty with conducting business from a vehicle is that there are inadequate surfaces upon which to write or place a computer. As possible supports for portable computers or writing pads, center vehicle consoles are generally narrow and awkwardly positioned and vehicle seats are low and sloped, forcing uncomfortable access to the pad or computer keyboard. For the vehicle driver, either the computer must be supported on the lap of the driver or in the passenger seat adjacent the driver. When supported on the driver's lap, the computer must rest between his/her abdomen and the vehicle steering wheel with the computer screen pivoted up against the steering wheel. This places the computer in an awkward position overly close to the driver's abdomen making use of the keyboard difficult.

Similarly, when positioned adjacent the driver in the passenger seat, the laptop computer can easily move around. In such position, the driver must completely twist laterally to an awkward position for access to the laptop keyboard which likewise is in a difficult position for use. Prior known portable desks have included work surfaces for supporting laptop or portable computers in movable fashion but have been difficult to use with vehicles including center consoles since the work surfaces could not be positioned near the vehicle driver's seat and also could not effectively position the computer near the driver's seat again causing awkward access. Moreover, the positioning of the supported computer in such prior desks was below another work surface which prevented the convenient positioning of computer peripherals such as a printer near the computer and for easy access by the user. Previously, computer printers were typically positioned in inconvenient or unreachable positions on the vehicle floor or in the rear seat or cargo area of the vehicle preventing their use by the driver without stopping and exiting the vehicle to reach the printer position. As a result, there is a need for supporting a laptop or portable computer in a position sufficiently close to the user and at an appropriate angle to allow convenient use especially when the user is seated in the driver's seat of a vehicle, while allowing the computer to be moved out of the way for safe storage when the user drives the vehicle. Likewise, there is a need for supporting a computer printer or another computer peripheral device for convenient use in conjunction with a computer, especially by a person seated in the driver's seat of a vehicle.

Therefore, a device is needed to contain and organize business and office items used by individuals transacting business from motor vehicles, or other temporary work areas, and to provide an adequate writing or typing surface in the passenger compartment of such vehicles or areas. Further, a convenient and accessible laptop or portable computer support with or without an accompanying computer peripheral device or printer support is needed for rapid and accessible use by a person seated in the driver's seat of a vehicle while also providing convenient storage for the computer in a position that will not hinder vehicle operation.

SUMMARY OF THE INVENTION

Accordingly, the present invention provides a portable desk adapted for use in temporary work areas such as a seat in a vehicle, the portable desk comprising a main body, the main body including a support surface adapted to engage a support such as the vehicle seat to support the main body thereon and a work surface member secured to the main body at a position spaced from the support surface. A first support member is adapted to receive a laptop or portable computer or similar device, the first support member being mounted on the work surface at a first position for access by a person seated in the driver's seat of the vehicle for use of the laptop or portable computer or similar device when the computer or similar device is mounted on the first support member and the portable desk is mounted in the front passenger seat of the vehicle. A second support member is adapted to receive a computer peripheral device, the second support member being secured to the work surface at a position spaced from the first support member for access to the computer peripheral device by a person seated in the driver's seat of the vehicle when the computer printer or similar device is mounted on the second support member and the portable desk is mounted on the front passenger seat of the vehicle.

In a preferred embodiment of the invention, the portable desk includes a opening in the work surface member, the opening extending between first and second positions and the support member mounted for movement along the opening. Preferably, the opening is a slot extending toward and away from the vehicle driver when the portable desk is mounted on the front passenger seat of the vehicle. In more preferred versions, the slot is curved such that the support member and any laptop or portable computer mounted thereon will move toward the side and back of the vehicle driver's seat when the support member is moved along the slot from the second position to the first position.

In yet other aspects of the invention, the work surface is positioned at the top surface of the main body while the work surface extends outwardly beyond the side of the main body that faces the vehicle driver and has an edge adjacent the vehicle driver. Preferably, the work surface extends above the center console of the vehicle when the desk is positioned in the front passenger seat to extend close to the vehicle driver. Further, the first position of the opening or slot is positioned adjacent the edge and spaced outwardly from the side of the main body.

In yet other aspects, the first support member includes a securing device, preferably an adjustable strap, for holding the laptop or portable computer thereon. Likewise, the second support member may include a securing device, preferably also an adjustable strap, for holding a computer printer thereon. One or both of the first and second support members may be secured to the work surface by a swivel or pivot for ease in access and use of the supported computer or printer.

In a further aspect of the invention, a portable desk for use in temporary work areas such as a seat in a vehicle comprises a main body, the main body having a support surface adapted to engage a support such as the vehicle seat to support the main body thereon and a top surface spaced above the support surface. A work surface member is secured to the main body at the top surface. A support member adapted to receive a laptop or portable computer or similar device is mounted on the work surface member for movement between first and second positions, the first position being closer to the vehicle driver than the second position when the portable desk is mounted in the front passenger seat of the vehicle, the first position allowing access by the vehicle driver for use of the laptop or portable computer when mounted on the support member.

In yet another aspect of the invention, a portable desk is adapted for use in temporary work areas such as a seat in a vehicle and comprises a main body, the main body including a support surface adapted to engage a support such as the vehicle seat to support the main body thereon and a top surface spaced above the support surface. A work surface member is secured to the main body at the top surface. A first support member is adapted to receive a laptop or portable computer or similar device, the first support member being mounted on the work surface member for movement between a first and second position, the first position being closer to the vehicle driver than the second position when the portable desk is mounted in the front passenger seat of the vehicle to allow access by a person seated in the driver's seat of the vehicle for use of the laptop or portable computer or similar device. A second support member is included and is adapted to receive a computer peripheral device, the second support member being secured to the work surface member at a position spaced from the first support member for access to the computer peripheral device by a person seated in the driver's seat of the vehicle when the computer printer or similar device is mounted on the second support member and the portable desk is mounted in the front passenger seat of the vehicle.

In yet other aspects of the invention, the portable desk comprises a generally cubical main body with a receptacle beneath the work surface member, the receptacle allowing access to the mechanism for adjusting the position of the first support member and portable computer and adapted to removably receive and store items for use by a user of the portable desk. The desk may also include additional storage areas for vertical files and the like.

Accordingly, the present invention provides numerous advantages over prior known computer supports and work surfaces for vehicles. The work surface of the present invention is properly positioned for support of the laptop or portable computer and an adjacent computer peripheral device such as a printer for easy access by the person seated in the driver's seat of the vehicle when the portable desk is positioned in the front vehicle passenger seat. The computer may be moved to a position close to the person in the vehicle driver seat and above any center console and to a position away from the user for secure storage when use is not desired. Both the laptop or portable computer and a computer peripheral device such as a computer printer can be mounted adjacent one another on the work surface such that any connecting cables or wires are easily managed thereby avoiding the need to thread wires through any support structure. In addition, the portable desk provides additional storage areas for other items useful in a mobile office environment or with the computer. The invention prevents the need for supporting a laptop or portable computer directly on the person seated in the driver's seat of the vehicle, allows the driver of the vehicle full access to the vehicle controls including the steering wheel without hindrance from the supported computer, allows the computer position to be easily adjusted for the convenience of the user, supports computer peripherals such as a printer in a convenient position adjacent the computer for ease of connection between the computer and the peripheral, and provides additional storage space for other office items, files and the like. Further, the portable desk includes securing devices for holding a computer and/or computer printer in position as desired.

These and other objects, advantages, purposes and features of the invention will become more apparent from a study of the following description taken in conjunction with the drawings.

DESCRIPTION OF THE PREFERRED EMBODIMENTS

Figure 1:
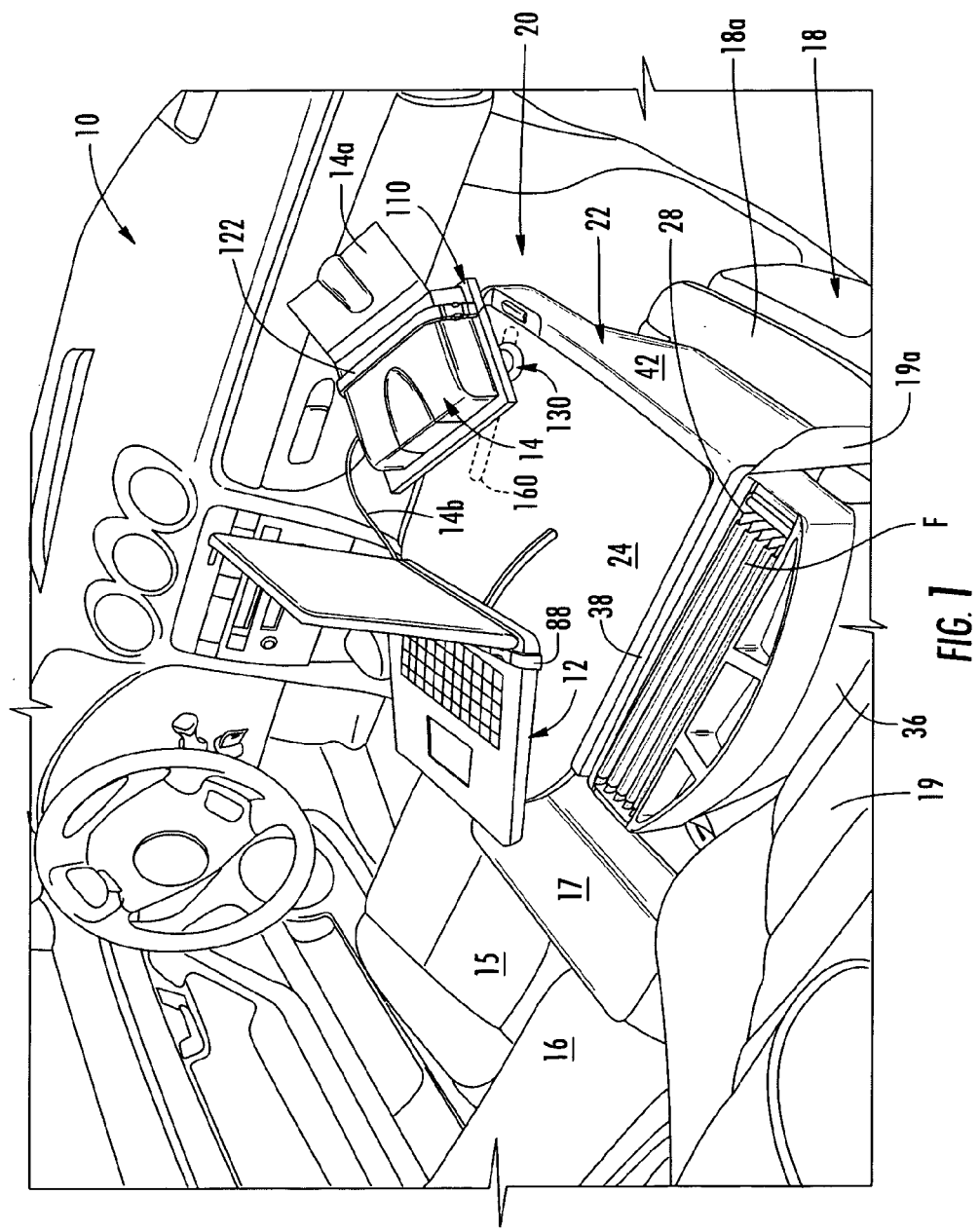
FIG. 1 is a perspective view of the interior of a typical passenger vehicle including the portable desk of the present invention supported in the front passenger's seat with a laptop or portable computer and a computer printer mounted on the desk for access by a person seated in the driver's seat of the vehicle.

The present invention is embodied in a portable desk or office device. In particular, the preferred embodiment of the present invention is intended to be placed on a seat in a vehicle and thereby provide a convenient work area for individuals conducting business in a mobile setting.

A preferred, embodiment of the present invention is shown in the drawings as portable desk 20. Portable desk 20 has a generally rectangular or cubical main body 22 that includes a work surface member 24 and a plurality of compartments or receptacles, such as horizontal compartment 26 below the work surface member, and a series of vertical compartments 28, 30, 32, and 34 adjacent the rear edge of work surface 24. Work surface member 24 comprises a generally planar member secured in a fixed position adjacent to and flush with the top or uppermost surface of main body 22. Work surface 24 is adapted to receive a computer support 80 which can be adjustably secured in a series of positions along the work surface member as desired by the user when a laptop or portable computer 12 is secured to the support. Likewise, work surface 24 receives and secures a support 110 for a computer peripheral device such as computer printer 14 in a convenient position adjacent the computer 12 for access by the user of the portable desk such as a person seated in the left-hand or driver's seat 15 when the portable desk 20 is secured in the right-hand or front passenger seat 18 of the vehicle 10. Work surface member 24 is adapted to extend over the center console 17 such that computer 12 may be moved toward the side and back 16 of driver's seat 15. Likewise, portable desk 20 is adapted to be received against seat back 19 of the front passenger seat 18 and secured via seatbelt 19a as will be more fully described below. Of course, for vehicles in which the driver is seated in the right-hand front seat, the arrangement of work surface member 24, compartment or receptacle 26, computer support 80 and computer peripheral support 110 can be reversed, i.e., in a mirror image of desk 20.

Figure 2:
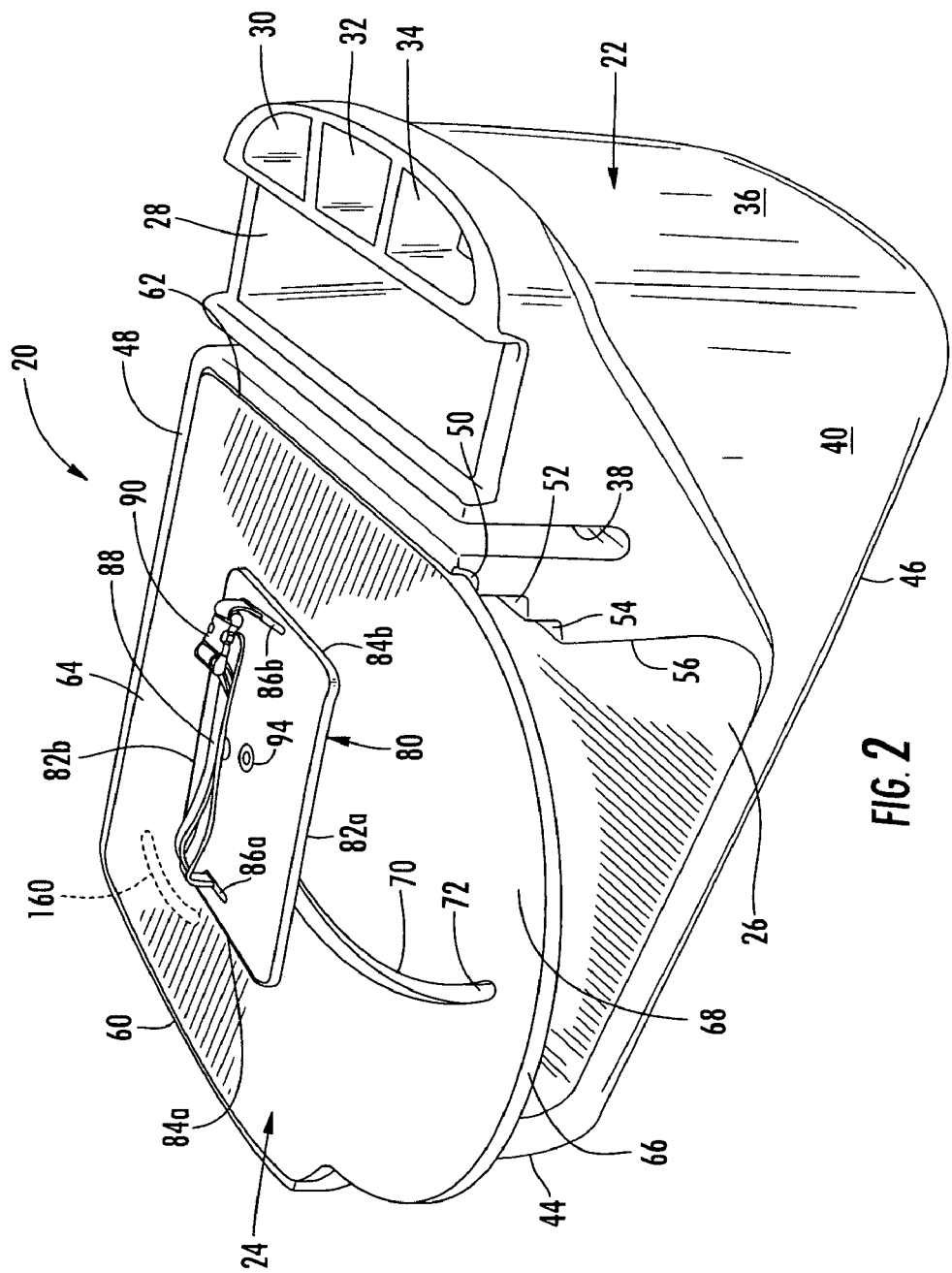
FIG. 2 is a perspective view of the portable desk of the present invention taken from the side of the desk adapted to face a user when seated in the driver's seat of the vehicle and showing the computer support secured to the work surface of the portable desk.

As shown in FIG. 1, portable desk 20 is adapted to be secured to a seat such as the front passenger seat 18 of a vehicle 10 by use of a seatbelt 19a. When installed on the vehicle seat 18 in this manner, with its back or rear surface 36 engaging the seat back 19, portable desk 20 provides a convenient location to store items such as folders, cellular phones, pens, laptop computers, peripheral items such as a computer printer, and the like. When needed for typing or writing, work surface member 24 provides a convenient area on which to support a writing pad as well as laptop or portable computer 12 and a computer printer 14. Rear or back surface 36 contacts seat back 19 such that the desk 20 is forwardly positioned within the passenger compartment of the vehicle. Seatbelt 19a for seat 18 is adapted to be received in upwardly opening slot 38 which extends from side to side across desk 20 as is best seen in FIGS. 1 and 2. When seatbelt 19a is tightened via its buckle and fastening apparatus, desk 20 is held downwardly and rearwardly into the corner of the seat between seat back 19 and the bottom 18a of seat 18 to prevent movement out of the seat during movement of the car.

In addition to back 36, desk 20 includes side surfaces 40 and 42 with side 40 adapted to face the position of the driver's seat 15 of vehicle 10, and a front surface 44. Desk 20 also includes a sloped or angled bottom surface 46 such that rear surface 36 is longer or taller than front surface 44 and wherein the slope of bottom 46 generally conforms to the angle of vehicle seat bottom 18a. Therefore, when angled bottom 46 of portable desk 20 is installed on a vehicle seat bottom 18a, as shown in FIG. 1, work surface member 24 is kept in a substantially horizontal orientation. Further, desk 20 includes a top surface 48 defining the upper end or edge of opening or receptacle 26 formed within desk 20. Desk 20 also includes a series of successively smaller and concentric shoulders or ledges 50, 52 and 54 extending around three sides of receptacle 26, the uppermost of which shoulder 50 receives work surface member 24. Shoulder 50 has a depth substantially the same as the thickness of work surface member 24 such that, when received, fixed and secured within shoulder 50, the top surface of the work surface member 24 is substantially flush with the top surface or rim of desk 48 as will be understood from FIGS. 1-3.

Figure 3:
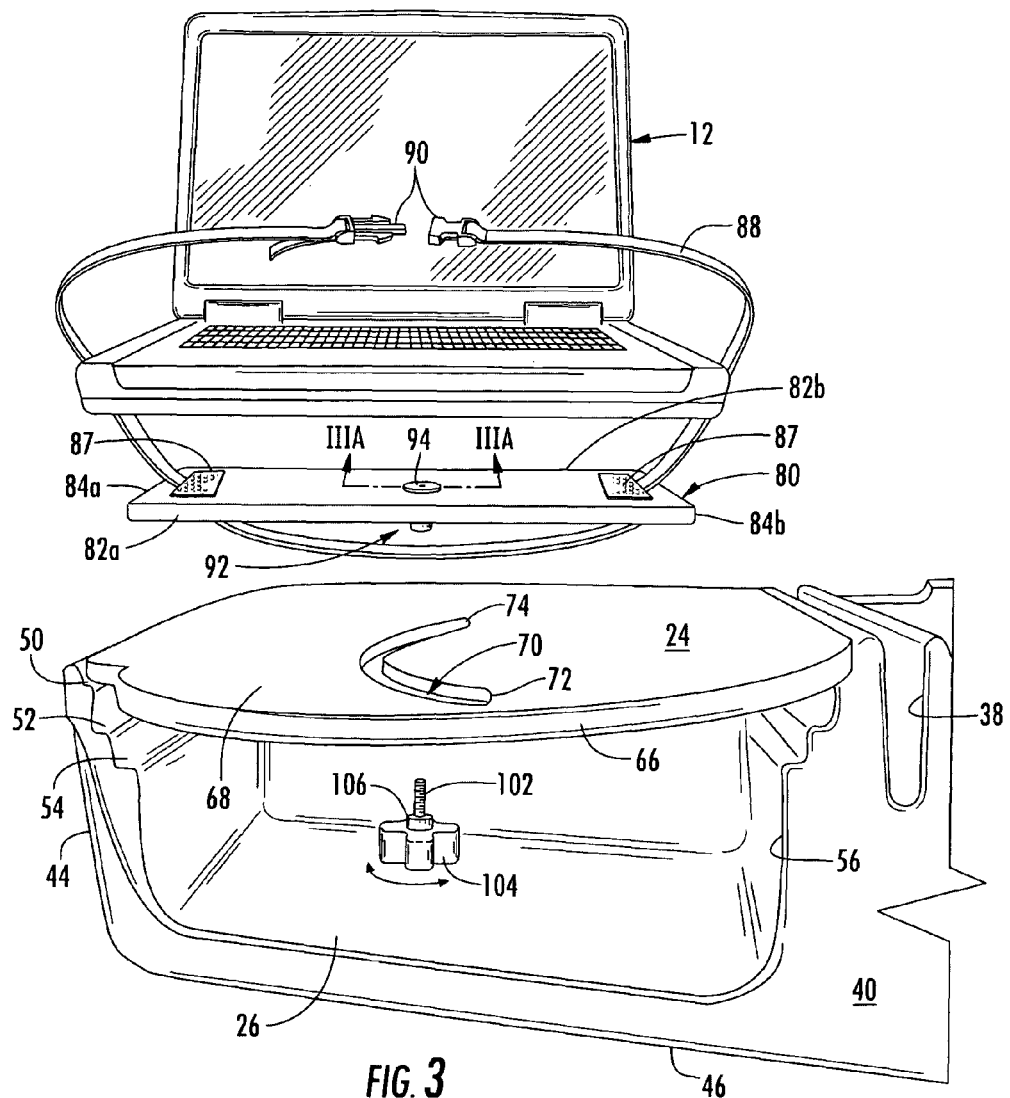
FIG. 3 is an exploded perspective view of the portable desk of FIGS. 1 and 2 showing the top work surface, computer support member and a laptop or portable computer to be positioned on the computer support member.

Immediately adjacent and spaced between slot 38 and rear surface 36 are vertical, open-topped receptacles 28, 30, 32 and 34. Receptacle 28 is substantially rectangular and, in a preferred embodiment, has a depth sufficient to receive the full length and depth of 8½ by 11 inch hanging file folders F (FIG. 1) such that the hangers for which extend over the side edges of receptacle 28 as shown in FIG. 1. In addition, immediately adjacent rectangular receptacle 28 are a series of shallower, smaller receptacles 30, 32, and 34 for receiving miscellaneous items such as paper clips, staple pullers, erasers and other items useful in a mobile office. Receptacle 26 is defined by the inside surface of front 44, the inside surface of side 42 and a vertical wall 56 extending downwardly from shoulder 54 as shown in FIGS. 2 and 3. Compartment or receptacle 26 thus opens through side 40 in a direction facing the driver's seat 15 of vehicle 10 when desk 20 is secured within the front passenger seat 18 as shown in FIG. 1. Receptacle 26 has a substantially planar bottom surface extending generally parallel to bottom 46 and is adapted to receive and confine therewithin larger items such as staplers, cellular telephones, telephone or computer charging apparatus, a laptop computer 12 or printer 14 when removed from support 80 or 110, hole punching devices, or other office equipment without allowing the same to move throughout the vehicle cabin when the vehicle is in motion. In the preferred embodiment, desk 20 is preferably constructed of a molded polymeric material such as polyethylene but may also be constructed of any other strong, rigid material capable of including the features described above. Although work surface member 24 is different as described below, the remainder of desk 20 is substantially similar to, and may include the features of, the portable desk described in U.S. patent application Ser. No. 11/098,155, filed Apr. 4, 2005, now U.S. Pat. No. 7,455,204, the disclosure of which is herein incorporated by reference herein. Likewise, the features shown in U.S. patent application Ser. No. 11/542,899, filed Oct. 4, 2006, now abandoned, the disclosure of which is hereby incorporated by reference herein, including the foldable, retractable support legs, may also be used in the present invention.

As will also be seen from FIGS. 1-3, work surface member 24 is a substantially planar member constructed of a material such as medium density fiberboard (MDF) and optionally including a non-slip coating or pad on the top surface thereof, if desired. Work surface member 24 includes generally parallel front and rear edges 60, 62 which themselves are generally parallel to securing slot 38 and receptacle 28 as well as vertical wall 56. In addition, work surface member 24 includes side edge 64 adjacent side 42 of desk 20. Front and rear edges 60, 62 extend generally at right angles to side edge 64 and substantially conform to the outline defined by shoulder 50 and rim or top surface 48 of desk 20. In addition, work surface member 24 includes an outwardly curved fourth side edge 66 which extends outwardly in an arc beyond side 40 and toward the position of seat 15 in vehicle 10 when desk 20 is mounted in the front passenger seat 18. Edge 66 has a substantially continuous curve extending from one end of shoulder 50 adjacent slot 38 to a position near one end of front wall 44. When desk 20 is mounted in seat 18, with work surface member 24 secured and received on shoulder 50, side edge 66 defines an area 68 which extends over top the typical center console 17 in vehicle 10 to a position adjacent the position of a person seated in the driver's seat 15 of vehicle 10 as shown in FIGS. 1 and 2. Area 68 is suitable for receipt of a writing pad, if desired, but also allows the positioning of laptop or portable computer 12 in a position immediately adjacent the person seated in vehicle seat 15 as described more fully below. Work surface member 24 also includes a curved slot 70 extending completely therethrough and having a first end 72 immediately adjacent edge 66 in extending area 68, as well as a second end 74 positioned generally in the center of the work surface member. Slot 70 is adapted to receive and mount a computer support plate or member 80 which, in the preferred embodiment, has a substantially rectangular shape as shown in FIGS. 2 and 3 as defined by generally parallel front and rear edges 82a, 82b and generally parallel side edges 84a, 84b. Adjacent each of the side edges 84a, 84b is a slot or opening 86a, 86b adapted to receive a securing strap 88 as shown in FIGS. 1-3. Strap 88 is preferably formed from flexible, woven fabric and includes a releasable snap closure 90 that allows the strap length to be adjusted. Closure 90 is a commercially available, releasable buckle having molded plastic ends 90a, 90b that may be connected to hold the strap ends together, or released by compressing opposed resilient prongs when desired. At least one end is adjustably connected to strap 88 so that the overall strap length may be adjusted. Strap 88 may be passed through slots 86a, 86b, along the underside of computer support member or plate 80 and upwardly over and around a laptop or portable computer 12 and tightened to securely hold the computer to the top surface of plate 80. If desired, the top surface of support member 80 may include non-slip or anti-slip support pads 87 thereon to help hold computer 12 when strap 88 is tightened (FIG. 3). Alternately, strap 88 may include a Velcro® fastening system for adjusting the strap length of the type described below for strap 122.

Figure 3A:
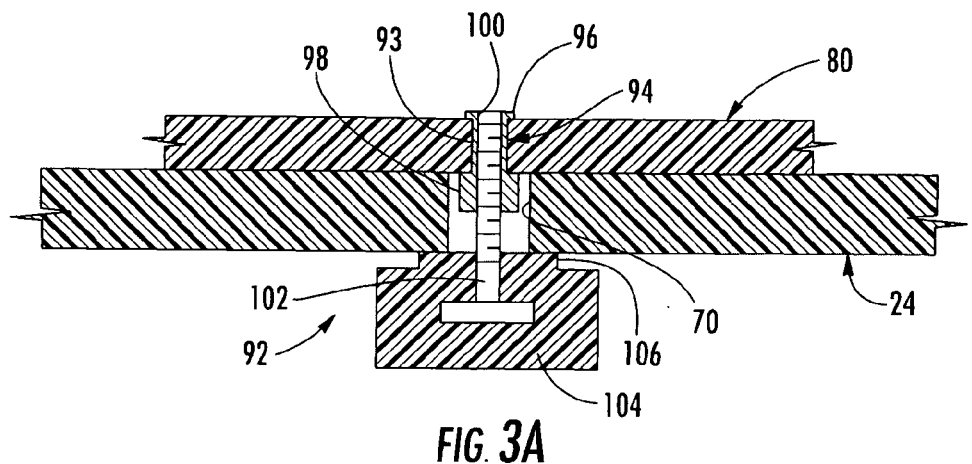
FIG. 3A is a sectional view of the swivel joint securing the computer support member to the work surface taken along plane IIIA-IIIA of FIG. 3.
Figure 4:
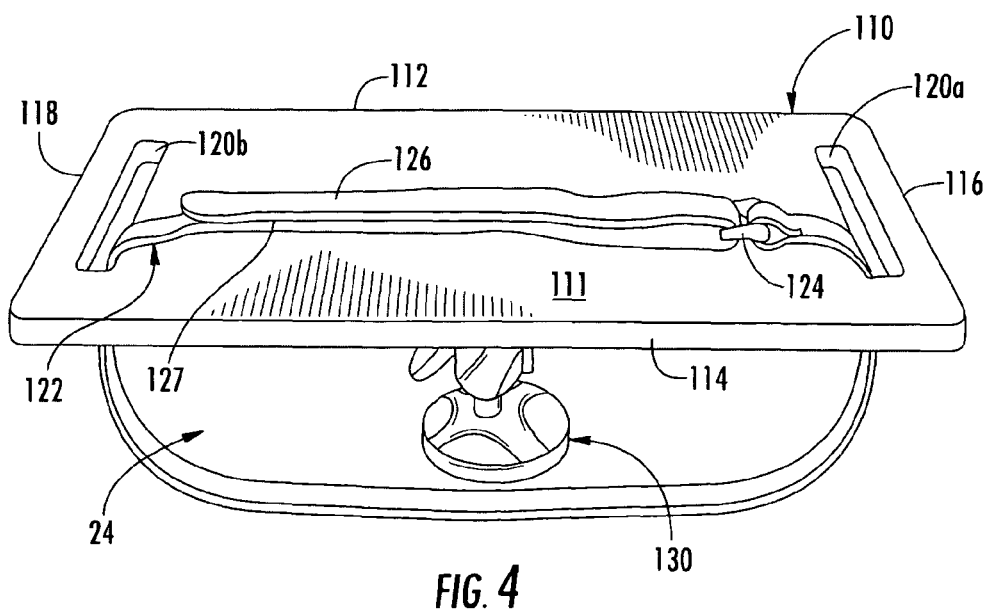
FIG. 4 is a perspective view of an optional computer printer support member mounted on a universal pivot support for use with the portable desk of the present invention.

Computer support plate or member 80 is adapted to be pivotally secured to work surface member 24 and, more specifically, slot 70 of work surface member 24, by a swivel assembly 92 best seen in FIGS. 3 and 3A. Swivel assembly 92 includes an internally threaded sleeve or stud 94 extending through a circular aperture 93 in plate 80. Sleeve 94 includes an upper flange or lip 96 having a diameter larger than the diameter of aperture 93 and a lower, substantially cylindrical pivot section 98 also having a diameter larger than aperture 93 and extending downwardly from the lower surface of plate 80 into slot 70. Cylindrical section 98 engages the sides of slot 70 to confine and retain swivel assembly 92 laterally within the slot while allowing movement along the slot and pivotal rotation of swivel assembly 92 and plate 80 at any position along the slot. A central threaded aperture 100 extends entirely through sleeve 94 for receipt of a correspondingly threaded stud 102 projecting out of the upper surface of a resilient handle or knob 104 which is preferably positioned or molded around the end of stud 102. Handle 104 includes an integral collar 106 extending upwardly therefrom and having a diameter larger than the width of slot 70 for engagement with the lower surface of work surface member 24 when stud 102 is threadably received and tightened within sleeve 94. Such tightening frictionally engages the bottom surface of computer support plate 80 with the upper surface of work surface member 24 to hold plate 80 and the supported computer 12 in a desired position.

As will now be understood from FIGS. 1-3 and 3A, adjustment of the position of computer support plate or member 80 and any laptop or portable computer 12 secured thereto via strap 88 is accomplished by inserting one hand in compartment or receptacle 26 and rotating handle 104 of swivel assembly 92 in a clockwise direction as shown in FIG. 3 thereby loosening threaded stud 102 in sleeve 94 and releasing the tight frictional engagement of computer support plate 80 from the top surface of work surface member 24. The combined computer 12, support plate 80 and strap 88 may then be pivoted about cylindrical pivot section 98 of sleeve 94 within slot 70 to position the keyboard and screen of computer 12 in the desired direction. Simultaneously, the combined computer, computer support plate and strap may be moved along the length of slot 70 between first end 72 adjacent edge 66 of work surface member 24 and second end 74 generally in the middle of the work surface member. Slot 70 is curved to allow movement of the support plate and computer outwardly through the extending area 68 of the work surface support member toward edge 66 and toward the side of seat 15 and a person seated in driver's seat 15 of vehicle 10 as well as toward seat back 16 of seat 15. Plate 80 may also be pivoted toward the driver such that he may easily reach the keyboard of the computer without twisting or having to assume an awkward or uncomfortable position. Computer 12 and computer support plate 80 are closest to seat 15 and seat back 16 when at end 72 of slot 70. When moved to the opposite end 74 of slot 70, the combined computer and computer support plate are positioned away from the person seated in seat 15 and in a storage position leaving a substantial portion of work surface member 24 and especially section 68 available for use for writing with a writing pad, a sheet of paper, or the like. When in the desired position, handle 104 is rotated by hand in a counterclockwise direction to tighten threaded stud 102 in sleeve 94 and securely hold the plate 80 against the top surface of work surface support member 24 as desired via the frictional engagement of collar 106 with the bottom surface of work surface member 24 adjacent slot 70, and the bottom surface of support plate 80 and top surface of work surface member 24.

In addition, swivel assembly 92 allows the combined support plate 80 and computer 12 to be swiveled in any direction within slot 70. One such direction is to swivel the combination of plate and computer around such that it faces away from the person in seat 15 and towards side 42 of the portable desk 20. In such position, and especially when the computer is positioned at end 74 of slot 70, the computer keyboard and screen are more easily accessible and usable by a person leaning into the vehicle through the passenger side front window of the vehicle. Hence, on construction sites or in other work areas including temporary work areas where persons are outside the vehicle but need to use computer 12, the computer can be positioned for use by a person outside the vehicle gaining access to the computer through one of the vehicle windows, all without moving the portable desk and simply by loosening handle 104, moving the plate 80 and the computer 12 to the desired position and retightening handle 104.

Figure 5:
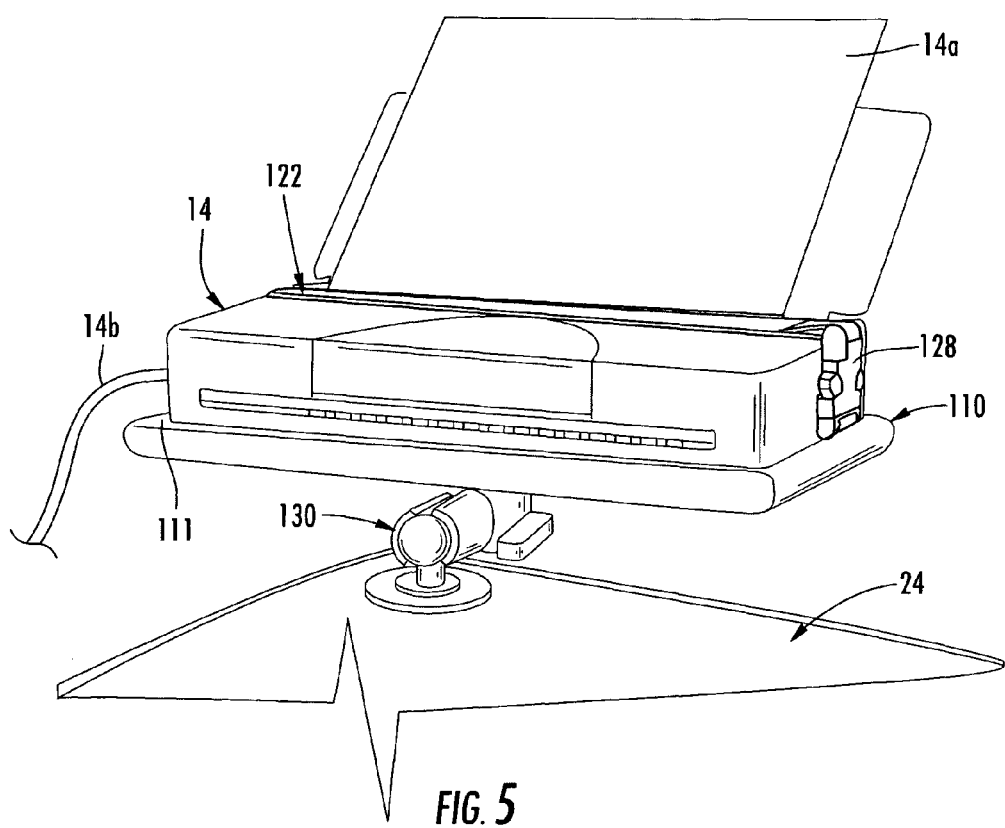
FIG. 5 is a perspective view of a computer printer secured to the computer printer support member and universal pivot support of FIG. 4 when mounted on the work surface of the portable desk of the present invention.

As will now be understood from FIGS. 1, 4-6 and 6A, work surface support member 24 is also adapted to support a computer peripheral device such as computer printer 14 on a printer or peripheral device support plate 110 by means of a universal pivot support assembly 130. Peripheral device support plate 110 is similar to computer support plate 80 and is preferably molded as a planar plate from a material such as expanded foam PVC. Plate 110 is preferably rectangular and includes front and rear edges 112, 114 which are generally parallel to one another and generally parallel side edges 116, 118. Adjacent each side edge 116 and 118 is a slot or opening 120a, 120b. Openings 120a, 120b are adapted to receive a securing strap 122 similar to strap 88 but optionally having a different type of closure mechanism including a rigid loop or buckle 124 through which end 126 of strap 122 is received. The underside of end 126 and the upper surface of strap 122 may include cooperating hook and loop fasteners 127 such as Velcro® material for securing the strap together with the desired tension after passing through loop or buckle 124. Printer 14 is adapted to be supported on the top surface 111 of plate 110 as shown in FIG. 5 with strap 122 passing through slots 120a, 120b from the underside of the plate 110 and over the top of printer 14 where it is secured and tightened with the desired tension. Top surface 111 may include non-slip or anti-slip pads such as those shown at 87 on plate 80 to hold printer 14 or another peripheral device when secured thereto.

As shown in FIG. 5, an alternate releasable snap clip or closure 128 may be included in strap 122 similar to closure 90 in strap 88 to also allow adjustment of the length of strap 122 in place of the Velcro® securing closure described above in connection with FIG. 4. Computer printer 14 may then receive paper or printing material on backrest 14a for passage through the body of the printer in response commands received from computer 12 via cable 14b. Alternately, other peripheral devices such as speakers, modems, or the like may also be secured to plate 110 and connected to computer 12 by appropriate wiring similar to cable 14b or printer 14. Plate 110 may also be enlarged to include more than one peripheral device at the same time.

Figure 6:
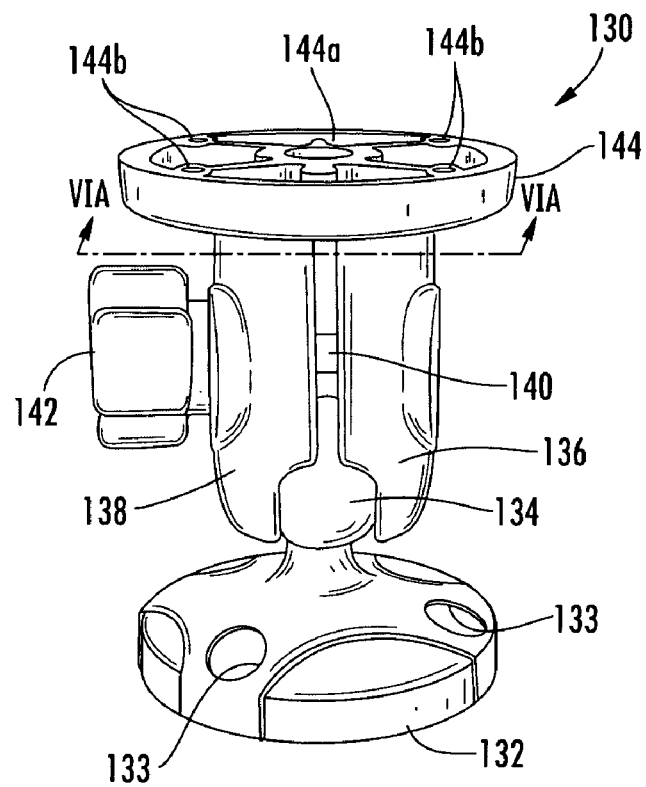
FIG. 6 is a perspective view of the universal pivot support for use with the computer printer support member shown in FIGS. 4 and 5.
Figure 6A:
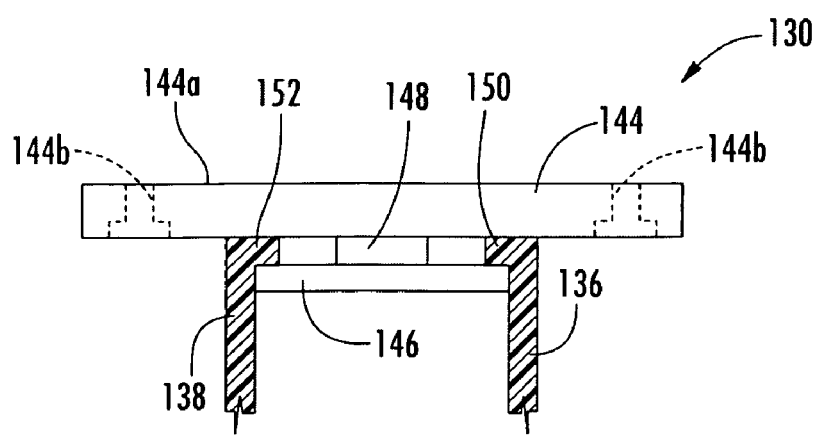
FIG. 6A is a fragmentary, sectional side elevation of the upper portion of the universal pivot support for the computer printer support member taken along plane VIA-VIA of FIG. 6.

As is best seen FIGS. 4, 5, 6 and 6A, printer support plate 110 is preferably supported on universal pivot assembly 130 of the type available from National Products Inc. of Seattle, Wash., under the trademark RAM Mount under Part. No. RAP-SB-190U. Universal pivot assembly 130 includes a base 132 having an integral, upstanding ball member 134 over which are received a pair of half cylinder support members 136, 138 held together around ball 134 by means of a threaded securing bolt 140. A flanged nut 142 having an internally threaded insert is received over the free end of bolt 140 to tighten the shell members 136, 138 toward one another for frictional engagement with and against ball member 134. An upper support member 144 includes a downwardly projecting collar 146 supported by in integral connector 148 having the external shape of a hex nut as shown in FIG. 6A. The upper end of each shell 136, 138 includes an inwardly projecting flange 150, 152 the free end surface of which has a hexagonal shape matching the exterior shape of connector 148. Hence, when shell members 136, 138 are tightened toward one another via bolt 140 and flange nut 142, the hexagonally shaped shoulders 150, 152 engage and confine the hex surfaces of connector 148 to prevent rotation of support member 144 with respect to the shell members. Since shell members 136, 138 are tightened against ball member 134, no movement is thereafter possible. The printer support plate 110 is adapted to be secured to the top surface 144a of support 144 via fasteners received through openings 144b. The bottom surface of base 132 is secured to work surface member 24 by fasteners received through openings 133 in base 132 to position pivot assembly 130 and plate 110 as desired on work surface 24 usually at a distance from plate 80 and computer 12 to avoid interference with movement of computer 12 in and along slot 70 on swivel assembly 92. Thus, by loosening flanged nut 142, shell members 136, 138 are loosened from ball member 134 allowing the pivot support and the printer support plate 110 secured thereto to be rotated or moved universally about ball member 134 so as to position the computer peripheral device such as printer 14 and support plate 110 horizontally or at an angle or facing in any direction 360 degrees around ball member 134. Alternately, support plate 110 may also be secured to work surface member 24 with a swivel assembly like assembly 92 in a second slot 160 formed (shown in phantom in FIGS. 1 and 2) in a desired direction in work surface member 24. Such additional swivel assembly would include a rotatable tightening handle also accessible through receptacle 26. Such a mounting would allow plate 110 to be moved along slot 160, swiveled, and secured in position for ease of access in a manner similar to plate 80.

Accordingly, it will now be understood that portable desk 20 is uniquely adapted to support both a portable or laptop computer 12 and a computer peripheral device such as printer 14 or a speaker, modem, or other item useful with and/or connected to computer 12 on the topmost surface thereof on work surface member 24. Both computer 12 and printer 14 are adjustable for easy access by a person seated in the driver's seat 15 of vehicle 10 or alternately in the opposite direction for a person accessing the computer and/or printer through the passenger window of the vehicle. Similarly, desk 20 can be positioned in one of the rear seats of the vehicle for access by a person seated in the opposite rear seat or through one of the rear windows of the vehicle, assuming the vehicle has a rear seat and rear windows. The portable desk may also be used in other non-vehicle, temporary work areas such as mobile construction offices, construction equipment, or the like. The portable desk is securely retained in the vehicle seat via seatbelt 19a passing through slot 38 from side to side across the desk while the computer 12 and printer 14 are each secured to their respective support plates via straps 88 or 122. Further, the computer 12 and support plate 80 is adjustably positioned via swivel assembly 92 while printer 14 and support plate 110 are pivotally and universally adjustable via universal pivot support 130. Other items useful in a mobile office may be stored within desk 20 in any of the available receptacles 26, 28, 30, 32 or 34 such that a complete mobile office is provided in the vehicle or other area with portable desk 20.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are as follows:

1. A portable desk adapted for use as a temporary work area on a seat in a vehicle, said portable desk comprising:
    a main body, said main body including a support surface adapted to engage the bottom section of a vehicle seat to support said main body thereon;
    a work surface member secured to said main body at a position spaced from said support surface;
    a first support member for receiving a laptop or portable computer, said first support member being mounted on said work surface member for access by the vehicle driver for use of the laptop or portable when the laptop or portable computer or similar device is mounted on said first support member and said portable desk is mounted on the front passenger seat of the vehicle, said entire first support member adapted to move parallel to and along said work surface member between a first position and a second position, said first position adapted to be closer to the position of the vehicle driver than said second position when said portable desk is mounted on the front passenger seat of the vehicle whereby the position of said first support member and any laptop or portable computer thereon is adjustable for convenient use by the vehicle driver; and a second support member for receiving a computer peripheral device, said second support being secured to said work surface member at a position spaced from said first support member for access to the computer peripheral device by the vehicle driver when the computer peripheral device is mounted on said second support member and said portable desk is mounted on the front passenger seat of the vehicle, said second support member being secured to said work surface member by a moveable connection that allows adjustment of the position of said second support member and any computer peripheral device thereon with respect to said first support member and any laptop or portable computer thereon.

2. The portable desk of claim 1 including an opening in said work surface member, said opening extending between said first and second positions, said first support member mounted for movement along said opening.

3. The portable desk of claim 2 wherein said opening is a slot adapted to extend toward and away from the vehicle driver when said portable desk is mounted on the front passenger seat of the vehicle.

4. The portable desk of claim 3 wherein said slot is curved such that said first support member and any laptop or portable computer mounted thereon are adapted to move toward the side and back of the vehicle driver's seat when said first support member is moved along said slot from said second position to said first position.

5. The portable desk of claim 2 wherein said main body includes a top surface; said work surface member being positioned at said top surface of said main body.

6. The portable desk of claim 5 including a storage receptacle below said work surface member.

7. The portable desk of claim 6 wherein said first support member includes an adjustable swivel connecting said first support member to said work surface member, said swivel being accessible through said storage receptacle for adjustment.

8. The portable desk of claim 5 wherein said main body has a side adapted to face the vehicle driver when said portable desk is mounted on the front passenger seat of the vehicle; said work surface member extending outwardly beyond said side of said main body and having an edge adapted to extend to a position adjacent the vehicle driver; said first position of said opening being positioned adjacent said edge and spaced outwardly from said side of said main body.

9. The portable desk of claim 2 wherein said main body has a side adapted to face the vehicle driver when said portable desk is mounted on the front passenger seat of the vehicle; said work surface member extending outwardly beyond said side of said main body and having an edge adapted to extend to a position adjacent the vehicle driver; said first position of said opening being positioned adjacent said edge and spaced outwardly from said side of said main body.

10. The portable desk of claim 1 wherein said first support member includes a securing device for holding a laptop or portable computer thereon.

11. The portable desk of claim 10 wherein said securing device is an adjustable strap.

12. The portable desk of claim 1 wherein said second support member includes a securing device for holding a computer peripheral device thereon.

13. The portable desk of claim 12 wherein said securing device is an adjustable strap adapted to hold a computer printer.

14. The portable desk of claim 1 wherein said first support member is secured to said work surface member by a swivel support.

15. The portable desk of claim 14 wherein said second support member is secured to said work surface member by a pivot support.

16. The portable desk of claim 15 wherein said pivot support is a universal pivot assembly including a ball pivot member, said second support member and any computer peripheral device thereon being universally movable about said ball member.

17. The portable desk of claim 15 wherein said movable connection of said second support member to said work surface member includes a slot in said work surface member; said pivot support including a swivel assembly mounted in said slot such that said second support member and any computer peripheral device thereon may be moved along, swiveled and fixed in various positions along said slot.

18. The portable desk of claim 1 including at least one storage receptacle adjacent said work surface member.

19. The portable desk of claim 1 wherein said movable connection of said second support member to said work surface member includes a slot in said work surface member, said second support member being mounted for movement along said slot such that said second support member and any computer peripheral device thereon may be moved along and secured in various positions along said slot.

20. A portable desk adapted for use as a temporary work area on a seat in a vehicle, said portable desk comprising:
    a main body, said main body including a support surface adapted to engage the bottom section of a vehicle seat to support said main body thereon, and a top surface spaced above said support surface;
    a work surface member secured to said main body at said top surface;
    a support member mounted on said work surface member and adapted to receive a laptop or portable computer, said entire support member adapted to move parallel to and along said work surface member between a first position and a second position, said first position adapted to be closer to the vehicle driver than said second position when said portable desk is mounted on the front passenger seat of the vehicle, said first position allowing access by the vehicle driver for use of the laptop or portable computer when mounted on said support member;
    said main body having a side adapted to face the vehicle driver when said portable desk is mounted on the front passenger seat of the vehicle; said work surface member extending outwardly beyond said side of said main body, and adapted to extend over any center console adjacent the front passenger seat, and having an edge adapted to extend to a position adjacent the vehicle driver; said first position being adjacent said edge and spaced outwardly from said side of said main body; said work surface member including a slot, said slot extending between said first and second positions and adapted to extend in a direction generally toward and away from the position of the vehicle driver, said support member mounted for movement along said slot; said slot extending to said first position adjacent said edge of said work surface member and beyond said side of said main body; said support member adapted to support any laptop or portable computer thereon such that at least a portion of the laptop or portable computer extends beyond said edge when said support member is positioned at said first position in said slot whereby at least a portion of the laptop or portable computer is adapted to be positioned immediately adjacent to the position of the vehicle driver for convenient use by the vehicle driver.

21. The portable desk of claim 20 wherein said slot is curved such that said support member and any laptop or portable computer mounted thereon is adapted to move toward the side and back of the vehicle driver's seat when said support member is moved along said slot from said second position to said first position.

22. The portable desk of claim 20 including a second support member adapted to receive a computer peripheral device, said second support being secured to said work surface member at a position spaced from said support member and adapted to allow access to the computer peripheral device by the vehicle driver when the computer peripheral device is mounted on said second support member and said portable desk is mounted on the front passenger seat of the vehicle.

23. The portable desk of claim 22 wherein each of said support member and said second support member includes a securing device for holding one of a portable computer or computer peripheral device thereon.

24. The portable desk of claim 23 wherein said support member is secured to said work surface member in said slot by a swivel support.

25. The portable desk of claim 24 wherein said second support member is secured to said work surface member by a pivot support.

26. A portable desk adapted for use as a temporary work area on a seat in a vehicle, said portable desk comprising:
 a main body, said main body including a support surface adapted to engage the bottom section of a vehicle seat to support said main body thereon, and a top surface spaced above said support surface;
 a work surface member secured to said main body at said top surface;
 a first support member for receiving a laptop or portable computer, said first support member being mounted on said work surface member for access by the vehicle driver for use of the laptop or portable computer when the computer is mounted on said first support member and said portable desk is mounted on the front passenger seat of the vehicle, said entire first support member adapted to move parallel to and along said work surface member between a first position and a second position, said first position adapted to be closer to the position of the vehicle driver than said second position when said portable desk is mounted on the front passenger seat of the vehicle whereby the position of said first support member and any laptop or portable computer thereon is adjustable for convenient use by the vehicle driver; and
 a second support member for receiving a computer peripheral device, said second support being secured to said work surface member at a position spaced from said first support member for access to the computer peripheral device by the vehicle driver when the computer peripheral device is mounted on said second support member and said portable desk is mounted on the front passenger seat of the vehicle, said second support member being secured to said work surface member by a moveable connection that allows adjustment of the position of said second support member and any computer peripheral device thereon with respect to said first support member and any laptop or portable computer thereon.

27. The portable desk of claim 26 wherein said main body has a side adapted to face the vehicle driver when said portable desk is mounted on the front passenger seat of the vehicle; said work surface member extending outwardly beyond said side of said main body, and adapted to extend over any center console adjacent the front passenger seat, and having an edge adapted to extend to a position adjacent the vehicle driver; said first position being adjacent said edge and spaced outwardly from said side of said main body.

28. The portable desk of claim 27 wherein said work surface member includes a slot adapted to extend toward and away from the vehicle driver when said portable desk is mounted on the front passenger seat of the vehicle; said first support member mounted for movement along said slot.

29. The portable desk of claim 28 wherein said slot is curved such that said first support member and any laptop or portable computer mounted thereon are adapted to move toward the side and back of the vehicle driver's seat when said first support member is moved along said slot from said second position to said first position.

30. The portable desk of claim 26 wherein said first support member includes a securing device for holding a laptop or portable computer thereon.

31. The portable desk of claim 26 wherein said second support member includes a securing device for holding a computer peripheral device thereon.

* * * * *

UNITED STATES PATENT AND TRADEMARK OFFICE
CERTIFICATE OF CORRECTION

PATENT NO. : 7,793,597 B2
APPLICATION NO. : 11/705206
DATED : September 14, 2010
INVENTOR(S) : Kevin J. Bart et al.

It is certified that error appears in the above-identified patent and that said Letters Patent is hereby corrected as shown below:

Column 10
Line 62, Claim 1, Insert --computer-- after "portable"
Line 63, Claim 1, Delete "or similar device" after "computer"

Signed and Sealed this

Twenty-third Day of November, 2010

David J. Kappos
*Director of the United States Patent and Trademark Office*